(12) United States Patent
Norris et al.

(10) Patent No.: US 7,343,017 B2
(45) Date of Patent: Mar. 11, 2008

(54) SYSTEM FOR PLAYBACK OF PRE-ENCODED SIGNALS THROUGH A PARAMETRIC LOUDSPEAKER SYSTEM

(75) Inventors: Joseph O. Norris, Ramona, CA (US); James J. Croft, III, Poway, CA (US)

(73) Assignee: American Technology Corporation, San Diego, CA (US)

(*) Notice: Subject to any disclaimer, the term of this patent is extended or adjusted under 35 U.S.C. 154(b) by 905 days.

(21) Appl. No.: 10/091,950

(22) Filed: Mar. 4, 2002

(65) Prior Publication Data

US 2002/0111795 A1    Aug. 15, 2002

Related U.S. Application Data

(63) Continuation-in-part of application No. 09/384,084, filed on Aug. 26, 1999, now Pat. No. 6,584,205, and a continuation-in-part of application No. 09/430,801, filed on Oct. 29, 1999, now Pat. No. 6,850,623.

(60) Provisional application No. 60/273,359, filed on Mar. 5, 2001.

(51) Int. Cl.
*H04B 3/00* (2006.01)
*H04B 5/00* (2006.01)

(52) U.S. Cl. .......................................... 381/77; 381/79

(58) Field of Classification Search ............... None
See application file for complete search history.

(56) References Cited

U.S. PATENT DOCUMENTS

| 5,095,509 | A | | 3/1992 | Volk |
| 5,276,669 | A | * | 1/1994 | Oohashi et al. ............... 369/86 |
| 5,619,383 | A | * | 4/1997 | Ngai ........................... 360/20 |
| 5,745,582 | A | | 4/1998 | Shimpuku et al. |
| 5,758,177 | A | | 5/1998 | Gulick et al. |
| 5,859,915 | A | | 1/1999 | Norris |
| 6,052,336 | A | | 4/2000 | Lowrey, III |
| 6,108,427 | A | | 8/2000 | Norris et al. |
| 6,205,104 | B1 | * | 3/2001 | Nagashima et al. ..... 369/59.14 |
| 6,229,899 | B1 | | 5/2001 | Norri et al. |
| 6,356,872 | B1 | * | 3/2002 | Leung et al. ............... 704/503 |
| 6,378,010 | B1 | | 4/2002 | Burks |
| 6,445,804 | B1 | * | 9/2002 | Hirayanagi ................. 381/303 |
| 6,678,381 | B1 | * | 1/2004 | Manabe ....................... 381/77 |

\* cited by examiner

*Primary Examiner*—Xu Mei
(74) *Attorney, Agent, or Firm*—Thorpe North & Western LLP (57) ABSTRACT

A method and system for generating parametric output directly from a prerecorded and error corrected parametric signal for playback in a parametric loudspeaker system. The method includes the step of retrieving a pre-encoded audio signal from an electronically readable storage medium. In addition, an ultrasonic carrier signal has at least one sideband which represents the pre-encoded audio signal. The next step is playing back the pre-encoded audio signal through an ultrasonic amplifier and emitter.

35 Claims, 7 Drawing Sheets

SYSTEM FOR PLAYBACK OF PRE-ENCODED SIGNALS THROUGH A PARAMETRIC LOUDSPEAKER SYSTEM

This application is a continuation-in-part of U.S. application Ser. No. 09/384,084 now U.S. Pat. No. 6,584,205 filed on Aug. 26, 1999, entitled "Modulator Processing for a Parametric Loudspeaker System"; and a continuation-in-part of U.S. Ser. No. 09/430,801, now U.S. Pat. No. 6,850,623 filed on Oct. 29, 1999, entitled "Parametric Loudspeaker with Improved Phase Characteristics" and also claims priority of Provisional Patent application No. 60/273,359 filed Mar. 5, 2001.

TECHNICAL FIELD

This invention relates generally to parametric loudspeakers which utilize ultrasonic sound waves for reproducing sound at frequencies in the audible range. More particularly, this invention relates to signal processing systems for parametric loudspeaker systems.

BACKGROUND ART

Parametric audio output in air is produced by the introduction of sufficiently intense, audio-modulated ultrasonic signals into an air column. Self-demodulation, or down-conversion, occurs along the air column resulting in an audible acoustic signal. This process occurs because of the known physical principle that when two sound waves with different frequencies are radiated simultaneously in the same medium, a sound wave having a wave-form including the sum and difference of the two frequencies is produced by the interaction (parametric interaction) of the two sound waves. So, if the two original sound waves are ultrasonic waves and the difference between them is selected to be an audio frequency, an audible sound is generated by the parametric interaction.

However, the interaction is non-linear in an elastic medium such as air; and, due to the non-linearities in the air column down-conversion process, distortion is introduced in the acoustic output. The distortion can be quite severe; and 30% or greater distortion may be present. Lowering the ultrasonic modulation amplitude level lowers the distortion, but at the expense of creating both a lower output volume and a lower power efficiency for the loudspeaker system.

In 1965, Berktay formulated that the secondary resultant output (audible sound) from a parametric loudspeaker is proportional to the second time derivative of the square of the modulation envelope. It was shown by Berktay that the demodulated signal, p2(t), in the far-field is proportional to the second time derivative of the modulation envelope squared.

$$p_2(t) \propto \frac{\partial^2}{\partial t^2}[(env(t))^2] \quad \text{(Equation 1)}$$

This is called Berktay's far-field solution for a parametric acoustic array. Berktay looked at the far-field because the ultrasonic signals are no longer present there (by definition). The near-field demodulation produces the same audio signals, but there is also ultrasound present which must be included in a general solution. Since the near-field ultrasound isn't audible, it can be ignored when considering only audible output, and with this assumption, Berktay's solution is valid in the near-field too.

The earliest use of this relationship in distortion reduction for parametric loudspeakers in air was modulator designs for parametric loudspeakers developed in the mid 1980's. This advancement included the application of a square-root function to the modulation envelope. Applying the square root function to the modulation envelope compensates for the natural squaring function that distorts the envelope of a modulated sideband signal emitted to the air. It has been shown that processing using square-root functions applied to double-sideband signals can theoretically produce a low distortion system; but it has been found as a practical matter that this requires very large bandwidth, and actually in theory it can be at the cost of requiring infinite system and transducer bandwidth. Of course it is not generally considered practical to try and produce a device that has an infinite bandwidth capability, or that tries to emulate one. Further, the implementation of this processing scheme with a significant bandwidth means that it is possible that the otherwise inaudible ultrasonic primary frequencies can extend down into the audible range (on the lower sideband). It will be appreciated that this can cause new distortion which can be at least as bad as the distortion eliminated by the "infinite" bandwidth square-root pre-processing system.

Moreover, just lowering/limiting the modulation amplitude level to prevent this new source of distortion is not an entirely satisfactory solution. Although it reduces the distortion, it also reduces the efficiency of the parametric conversion process. Moreover, clipping the lower frequencies so that they do not extend down into the audible range mitigates the latter distortion problem, but re-introduces distortion into the audio signal produced by the parametric array as it disrupts the sum and differences from time to time as the bottom is filtered out in the lower sideband.

For this and other reasons, it has historically been deemed very difficult to produce a strong undistorted audio output from parametric loudspeakers. These problems at least in part arise due to the difficulty of correcting for the significant distortion created by the down-conversion of the ultrasonic waves in the air.

Furthermore, in one application the desired audio signal is amplitude modulated (AM) onto an ultrasonic carrier of 25 kHz to 60 kHz, then amplified, and applied to an ultrasonic transducer. The outer envelopes of the carrier wave, or sidebands, carry the audio signal. If the ultrasonic intensity is of sufficient amplitude, the air column will perform a demodulation or down-conversion over some length (the length depends, in part, on the carrier frequency and column shape). The modulation of the ultrasonic carrier with the audio signal takes place using additional modulation circuitry, which increases the complexity and cost of the parametric loudspeaker system. Moreover, the carrier signal can be quite intense in this implementation, in order to get the system to work well in producing the audible waveform in air.

Due at least in part to the requirements, difficulties, and problems discussed above, parametric loudspeaker systems have been developed that pre-process the audio signal or modulated signal to allow a reduced distortion audio output to be heard after demodulation in the air. The first part of the processing is the modulation of the ultrasonic signal by the audio signal. An audio signal covers a range of approximately 20 Hz to 20 kHz. To produce a modulated ultrasonic signal a carrier frequency must be modulated with an audio signal of a lower frequency. For example, a 35 kHz signal might be used as the ultrasonic carrier and modulated with the original audio signal (e.g., a 10 kHz audio signal). This provides a new double sideband bandwidth of 25 kHz to 45 kHz which is in the ultrasonic range. This modulation can be performed using analog circuitry or digital signal processing, but this extra modulation circuit increases the cost of the overall parametric audio system as compared to conventional loudspeakers.

Another part of the pre-processing that can take place is the distortion correction. The distortion correction can include applying a square root to the signal to compensate for the second order distortion. This square root process can be applied to the audio input signal and/or an iterative envelope matching correction can be applied to the modulated signal to compensate for the second order distortion as predicted by the Berktay equation. These correction methods are described in detail in U.S. Pat. No. 6,584,205 entitled "Modulator Processing for a Parametric Loudspeaker System" filed on Aug. 26, 1999 and International Patent No. PCT/US00/23392 with the same title, which are hereby incorporated by reference. This distortion correction produces significant processing overhead especially if it is done iteratively. A considerable additional cost is also incurred because a signal processing chip or analog circuitry must be included in the speaker system to perform this function.

In short, these additional costs of implementing parametric systems generally within the audio industry continue to impede acceptance of parametric sound systems in day to day applications. This occurs despite the fact that parametric speakers offer unique advantages of directionality far exceeding that of conventional audio systems.

SUMMARY OF THE INVENTION

The invention provides a method for generating parametric output from a parametric loudspeaker system. The first step comprises retrieving a pre-encoded audio signal from a pre-recorded electronically readable storage medium. The pre-encoded audio signal is represented by an ultrasonic carrier signal with at least one sideband. The next step is feeding the pre-encoded audio signal through an ultrasonic amplifier and emitter. The pre-encoded audio signal can also be distortion error corrected.

In accordance with one aspect of the present invention, the system includes a method for storing pre-encoded signals for later playback from a parametric loudspeaker system. The first step is modulating the ultrasonic carrier with the audio signal to create at least one sideband which represents the audio signal and to produce a processed signal. The next step is storing the processed signal on an electronically readable storage medium for replay by the parametric loudspeaker system. An optional step is applying error correction or signal calibration to the modulated signal to form the processed signal before it is stored on an electronically readable storage medium.

In accordance with another aspect of the present invention, the system includes a method for generating parametric output from a parametric loudspeaker system. The method includes the step of modulating an ultrasonic carrier signal with an audio signal to produce a processed signal. Another step is storing the processed signal on an electronically readable storage medium. The next step is playing back the processed signal through an ultrasonic amplifier and emitter.

Additional features and advantages of the invention will be set forth in the detailed description which follows, taken in conjunction with the accompanying drawings, which together illustrate by way of example, the features of the invention.

DETAILED DESCRIPTION

For the purposes of promoting an understanding of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 1:
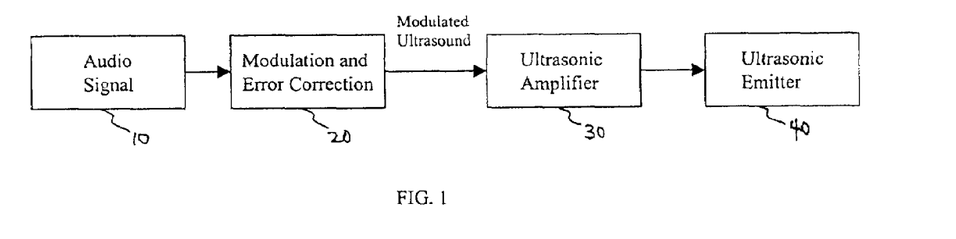
FIG. 1 is a block diagram of a parametric sound system which includes ultrasonic carrier modulation and distortion error correction or signal calibration.

FIG. 1 illustrates a parametric loudspeaker system, which receives an incoming audio signal 10 from an audio source such as a compact disk, radio signal or any other known electronic signal source. An ultrasonic carrier signal 20 is first modulated with the audio signal. In other words, the ultrasonic carrier has at least one sideband and represents a pre-encoded audio signal. Then distortion error correction or signal calibration is applied which corrects for the distortion produced in the parametric output. An ultrasonic amplifier 30 is used to amplify the modulated and corrected signal, which is applied to the ultrasonic emitter 40. The ultrasonic amplifier can be any type of linear or ultrasonic amplifier, including a Class B amplifier or a more efficient modified Class D power amplifier, as taught in copending PCT Patent Application Serial No. PCT/US01/21749 entitled "Power Amplification for Parametric Loudspeakers" filed on Jul. 11, 2001, which is hereby incorporated herein by reference.

Because of the cost of including the additional circuitry needed for ultrasonic modulation and distortion error correction, it is very economical to avoid including this additional processing with every parametric loudspeaker system. This is possible when an electronically readable storage medium is used, and if the audio signal is pre-processed with the ultrasonic carrier frequency or non-linear distortion correction before the signal is stored on the storage medium. Those in the prior art have apparently not realized the value of storing a pre-processed ultrasonic signal directly on a storage medium for use with parametric loudspeakers. This is because it is commonly desired to have a parametric system that can play a signal from any unprocessed audio signal source which the parametric loudspeaker system might be connected to. In other words, the conventional thinking was to provide a system which can receive any audio signal and then play it back, but this requires the pre-processing discussed.

Figure 2:
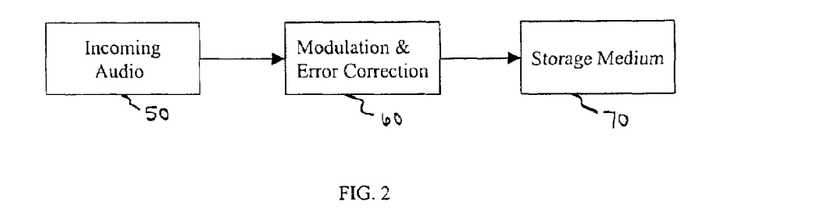
FIG. 2 is a block diagram illustrating a method of pre-processing an audio signal with ultrasonic modulation and distortion error correction, and then storing the parametric signal on an electronically readable storage medium.

The important insight has been made that pre-modulated or pre-processed parametric signals can be stored on storage mediums with high bandwidth capability, which have a frequency range extending above 20 kHz. Then these parametric signals can be played back through a parametric loudspeaker system without the expense of a complete signal processing system with each playback system. FIG. 2 illustrates an incoming audio signal 50 that will be pre-processed. An ultrasonic carrier frequency is modulated with the audio signal so that the ultrasonic signal includes at least one sideband and represents a pre-encoded signal. Then distortion error correction or signal calibration is applied 60. At this point, frequency response correction or equalization can be applied to the signal as needed to match the ultrasonic emitter and other system characteristics. Signal compression can also be applied to the signal at this point.

The modulation that takes place in the system can be amplitude modulation, frequency modulation, single sideband modulation, double sideband modulation, truncated sideband modulation, or any other signal modulation method that can generate parametric output. Modulation can be performed in a number of ways that are mathematically equivalent even though the actual steps performed may vary slightly. For example, if a 40 kHz signal is modulated with a 1 kHz signal, the double sideband output of that modulation can be equivalent to a 40 kHz signal that is summed with at least 39 kHz and 41 kHz sidebands. Furthermore, known modulation processes create distortion products that can be corrected by pre-processing the audio signal or pre-processing the modulated audio signal (i.e., the ultrasonic carrier signal modulated with the audio signal). It is important to mention that the incoming signal 50 (FIG. 2) can be any audio signal which is well known to those skilled in the art.

After the signal has been pre-processed, it may be written to a storage medium 70 that has a bandwidth capable of storing a parametric signal. A Super Audio CD is one medium onto which the pre-processed or pre-modulated signal can be copied, which in first generation form has an effective 48 kHz bandwidth (up to 100 kHz), and are sold by the Philips and Sony corporations. These systems are intended to increase the resolution of music by more closely following the original wave form of the music, which results in music reproduction that is faithful to the original. It is often valuable to use such a storage medium which is removable and transportable.

Another effective storage medium is a flash memory module which can store the pre-processed parametric signal. For example, 12 megabytes of flash memory can store a few minutes of program material at 96 kHz of bandwidth. Other storage mediums can also be used such as hard drives, or other forms of programmable memory. High bandwidth storage mediums are also effective for storing a pre-modulated signal as long as the medium can store signals with a frequency of 25 kHz-100+kHz. Alternately, a distortion error corrected signal that does not include ultrasonic modulation can be stored on a digital storage medium that is provided for storing an audible audio range.

Figure 3:
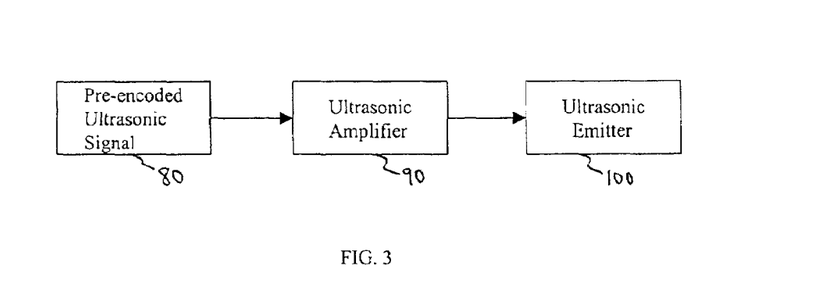
FIG. 3 is a block diagram illustrating a method of generating parametric loudspeaker output using a pre-encoded parametric signal.

FIG. 3 illustrates the playback of a pre-processed or pre-encoded sound signal. In this embodiment of the invention, the modulation and distortion correction circuits are eliminated during the playback process. The only parametric loudspeaker specific hardware components needed are an ultrasonic amplifier and an ultrasonic transducer as known to those skilled in the art. A pre-encoded signal is retrieved from a high bandwidth, electronically readable medium 80. An ultrasonic carrier has already been modulated with this audio signal and then it has been distortion error corrected. The signal is then passed to the ultrasonic amplifier 90 for amplification and then onto the ultrasonic emitter 100 for emission into the air. The ultrasonic waves are demodulated in the air, which produces an audible sound for a listener. A very important aspect of this playback is that some portion of the signal processing has been separated from the parametric loudspeaker playback. Separating some or all of the signal pre-processing from the actual playback system reduces the cost and complexity of the playback system.

This pre-encoding method provides an audio signal which is pre-processed before it reaches the parametric loudspeaker playback system. A single encoding and recording system can be used to create program material for multiple simplified hardware systems. If many CDs or program copies are going to be made, then only one image of the program is pre-processed and copied to the parametric capable storage medium or onto optical storage. For example, the audio signal could be pre-processed and then remotely stored on a network processing node or network server. Then when access is desired, the modulated and pre-corrected signal is streamed over a wideband network connection or an Internet connection to the parametric loudspeaker system. Performing remote or off-line processing allows a very powerful remote computer to perform extensive error correction or calibration methods that are not practical in a real time system. A less powerful remote computer can also be used, but it must be allotted more time to perform the error correction or calibration methods. Then the processed audio signal is played back in real time after off-line processing. Alternatively, the unprocessed audio filed can be uploaded by a user across a network (or the Internet) to a server or processing node. Then the audio signal can be processed and returned to the user for playback on their parametric loudspeaker system One alternative embodiment of the invention is to use a slow and inexpensive processor in the recording system. This reduces the cost of the recording system. When an audio program is received, it is processed by the slow processor (because the encoding process may not be time critical) and then stored on a playback storage medium such as flash memory or a hard drive that can operate in real time. Then the stored audio image can be replayed in real time. Alternately, a slow processor can also be used to create the original parametric recording which is copied onto a static storage medium such as Super Audio CDs. Since real time performance is only needed in the final playback step, the amount of computing power required for pre-preprocessing can vary and may be selected based on cost rather than on speed.

Figure 4:
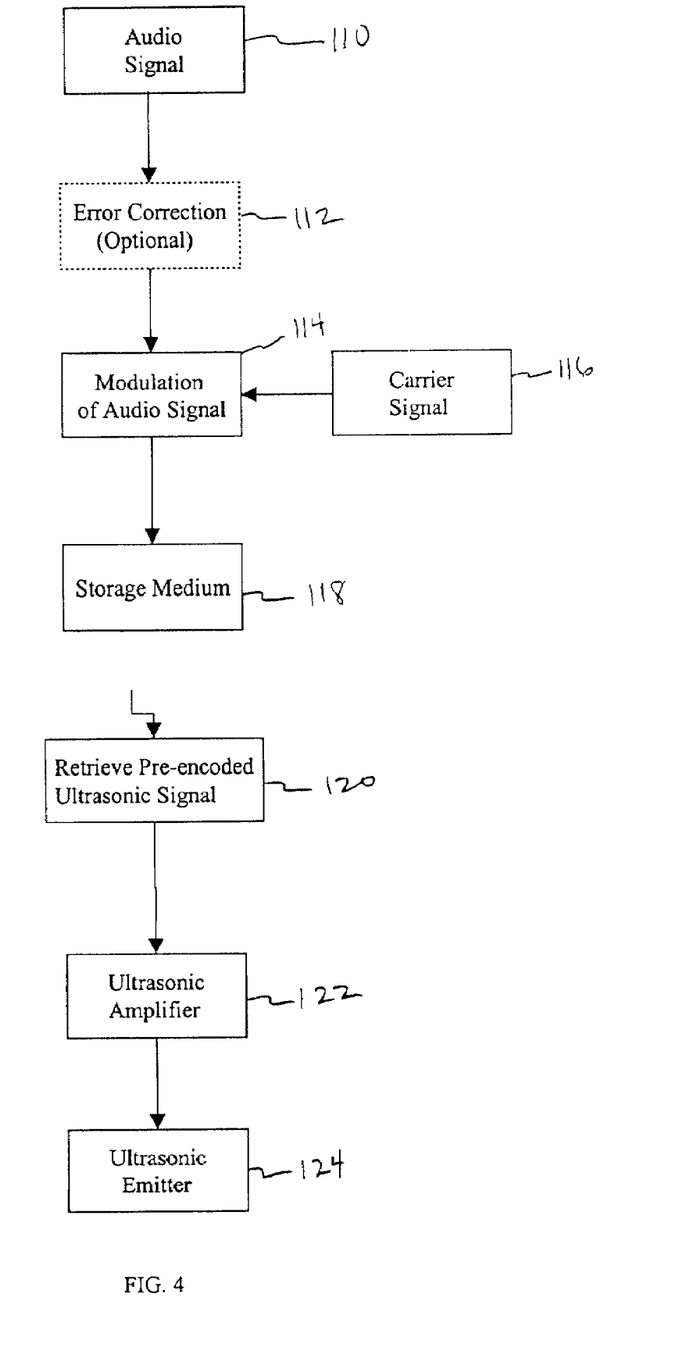
FIG. 4 is a block diagram illustrating a parametric sound system which includes a pre-processed audio signal and optional error correction or signal calibration.

FIG. 4 is a block diagram of a parametric sound system which depicts optional error correction or calibration. The audio signal 110 enters the system from a signal source which is typically a pre-recorded program. Then an optional error correction 112 may be included to pre-correct the signal for parametric demodulation distortion. The error correction that is preferably used before ultrasonic modulation is applying a square root to the signal. It is desirable to perform the majority of the correction for non-linear distortion before the pre-encoded signal is stored on a storage medium. Although, if necessary, some or most of the correction for non-linearity can be applied in real time during playback.

Regardless of whether or not error correction or calibration is applied, an ultrasonic carrier signal 116 is modulated with the audio signal 114 to provide an ultrasonic signal having at least one audio sideband. The pre-encoded signal is stored on an electronically readable storage medium 118. For example, it may be recorded on an optical storage disk, hard drive, read only memory (ROM), random access memory (RAM), programmable memory, or a flash memory module. At some later point in time (as represented by the broken arrow), the pre-encoded ultrasonic signal is retrieved from the storage medium 120 and sent to an ultrasonic amplifier 122 and then output by an ultrasonic emitter 124. Omitting the error correction or distortion correction may allow the final output to be somewhat distorted, but this is acceptable in some audio program applications. It is preferable to apply the error correction and/or calibration, but it is not necessary.

Figure 5:
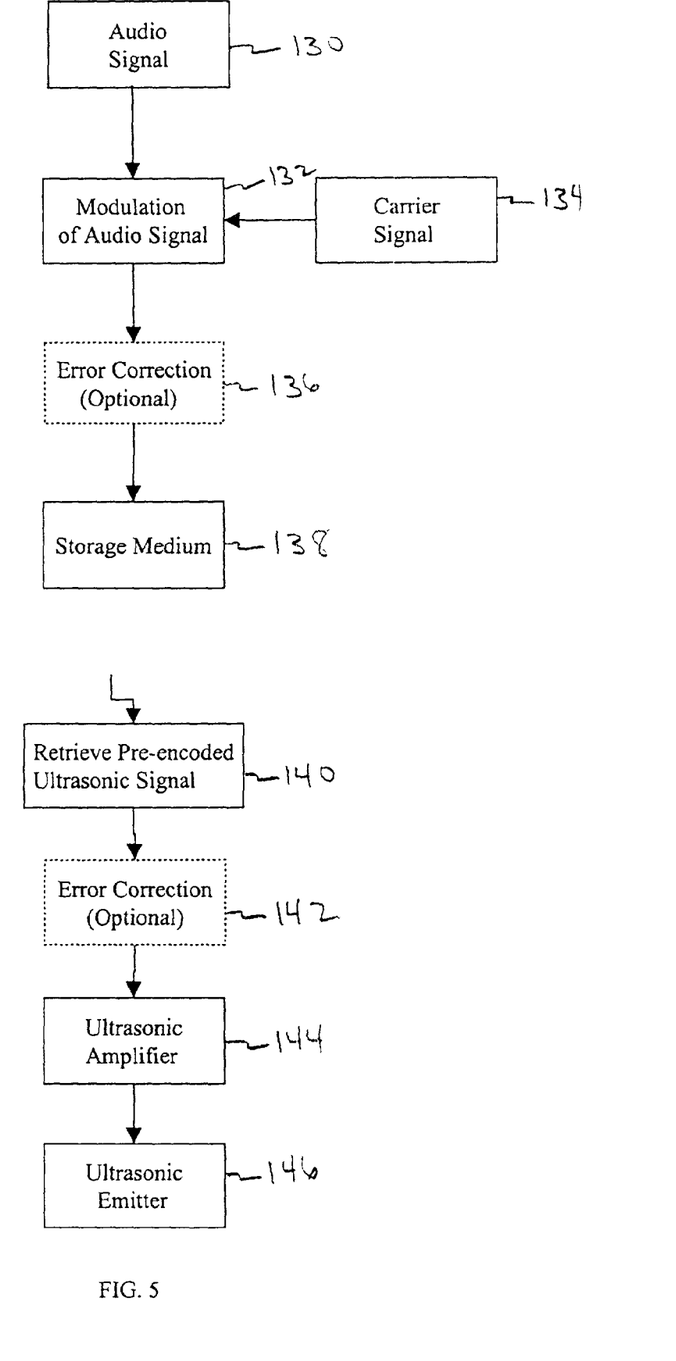
FIG. 5 is a block diagram illustrating a parametric sound system which includes a pre-processed audio signal with optional error correction or signal calibration after the modulation and/or optional error correction before the final output.

FIG. 5 is a block diagram of a parametric sound system which includes a pre-processed audio signal with optional error correction or calibration after the ultrasonic modulation. The input audio signal 130 enters a modulator 132 and the ultrasonic carrier signal 134 is modulated with the audio signal to produce an ultrasonic signal with at least one audio sideband. After the modulation is complete, an optional iterative error correction process 136 is applied which transforms the signal to match a required output envelope to overcome distortion. The iterative error correction is preferably performed after modulation takes place. The pre-encoded audio signal is then stored on an electronically readable storage medium 138. The pre-encoded signal is later retrieved from the storage medium by a retrieval system or retrieval unit 140. A second optional error correction 142 can then be applied, which corrects for linear or non-linear distortion created in the ultrasonic amplifier 144 and the ultrasonic emitter 146. If the first iterative error correction 136 is omitted, it can be applied in real-time during the retrieval and playback process 140-146.

The system may also apply the correction for the emitter distortion before the pre-encoded audio is stored on the storage medium. This is most useful when the characteristics of the ultrasonic emitter are known in advance. Alternately, a predicted correction can be applied for a class of emitters before the signal is stored and then a final correction can be applied in real time based on the actual emitter used by the parametric system. The playback system can also include a query unit, feedback unit, or interrogation system to determine the distortion parameters of the ultrasonic emitter and then a correction can be applied based on the emitter's parameters. An equalization correction for the emitter or the overall system can be applied before or after the pre-encoded audio is stored on the storage medium. The equalization or calibration for the ultrasonic emitter and amplifier may be based on humidity, the distance of the listener, altitude, or emitter material characteristics.

The advantage of performing the second error correction on the playback side is that it allows error correction or calibration to be tailored for the physical output characteristics of different ultrasonic emitters. These two types of error correction could also be switched. A correction for physical characteristics may take place before the pre-encoded signal is stored on a storage medium. Then correction for parametric distortion may be applied during signal playback. Of course, all the error correction and calibration can take place before the signal is stored on the storage medium.

In one embodiment, a portion of the modulation may take place before the pre-encoded signal is stored on the storage medium. Then another portion of the modulation may take place during playback. For example, the carrier signal may initially be modulated with an audio signal before it is recorded onto the storage medium and then modulated with an additional carrier when it is played back. In a similar manner, the error correction and calibration for a portion of the audio bandwidth can be performed before the pre-encoded signal is stored and then error correction can be applied for a different portion of the audio bandwidth when the signal is retrieved for playback.

Figure 6:
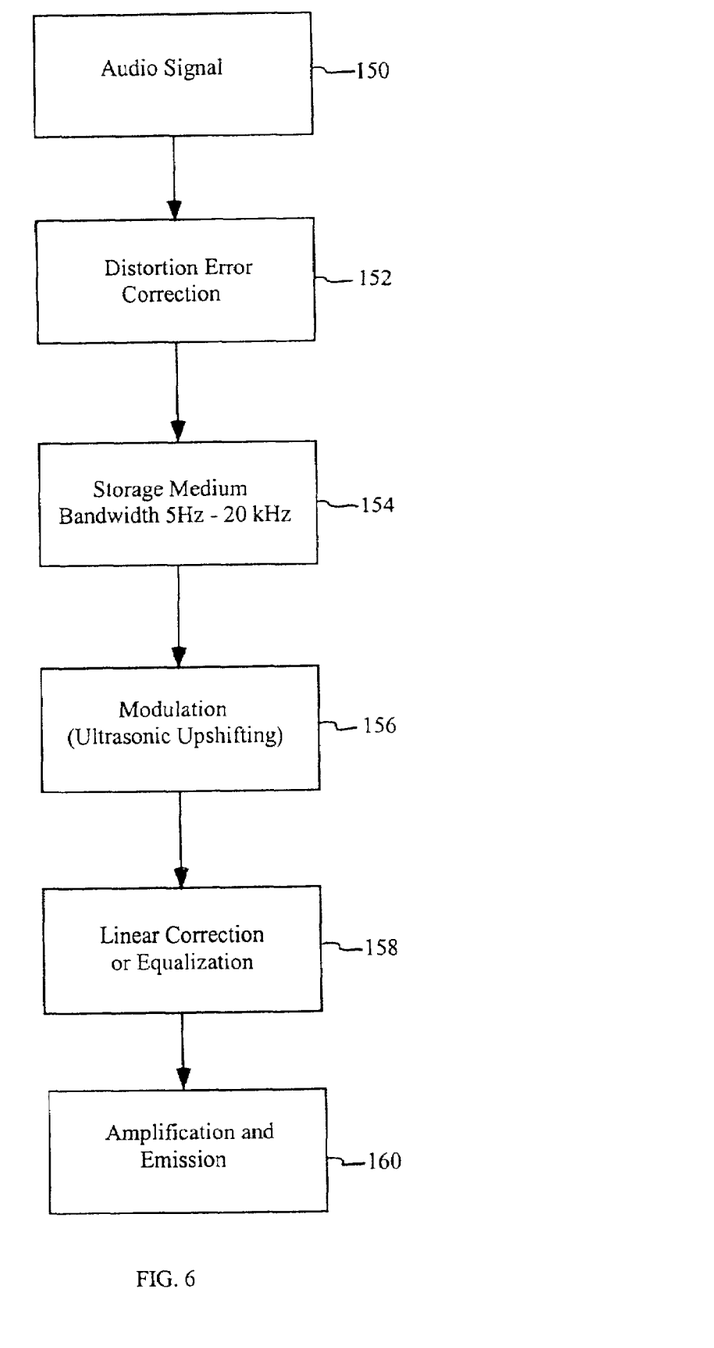
FIG. 6 illustrates a parametric sound system which stores a distortion error corrected signal on a conventional audio bandwidth medium.

Another important embodiment of the present invention is illustrated in FIG. 6. This embodiment uses a storage medium with a conventional audio bandwidth of approximately 5 Hz to 20 kHz. This is the maximum audible range that some experts believe can be sensed by humans. In this method, an audio signal 150 is received and then distortion error correction 152 is applied. The distortion error correction can be the application of a square root to a double sideband signal, which may then be truncated on both edges. If desired, the corrected double sideband signal can be filtered or truncated to be a single sideband signal. A separate method of error correction is applying iterative error correction to the original audio signal to correct for non-linear distortion in air or other distortions in the parametric system itself. The iterative correction may be a recursive correction, which employs multiple computation passes to conform the audio signal to a predetermined envelope. In situations where less correction is desired, a single correction pass can be made. An iterative correction is preferably applied to a single sideband signal but it can be applied to other audio signal forms such as double sideband.

After the distortion error correction has been applied, the pre-distorted audio signal is stored on an electronically readable storage medium with an audio bandwidth 154. This is preferably an audio compact disk (CD), RAM, programmable memory, or another electronic storage medium, which stores audio signals between 5 Hz to 20 kHz. The use of a widely available storage medium that is low cost, such as a CD, reduces the overall expense of a parametric loudspeaker system. After the error corrected audio signal is saved on the storage medium, it is then transferred (physically or electronically) to a playback device. Before playback on the parametric loudspeaker system can occur, the pre-distorted signal must first be retrieved and modulated with an ultrasonic carrier 156. Next any optional linear correction or equalization takes place 158. Finally, the pre-encoded signal is amplified and emitted into the air using an ultrasonic emitter 160.

Another embodiment for storing the pre-processed signal on an audio bandwidth CD or storage medium will now be discussed. The original audio signal is first error distortion corrected or pre-distorted to produce a signal that produces the appropriate demodulated output. Next, an ultrasonic carrier signal is modulated by the audio signal, which produces an error corrected signal that is in the ultrasonic range. Then this signal in the ultrasonic range is compressed using digital compression techniques.

The significance of the compression is that it allows the ultrasonic bandwidth signal to be stored on a conventional audio CD with only audio bandwidth. In other words the distortion should compensate for any significant spectrum expansion associated with the error correction and modulation. The compression used is preferably a lossless compression technique because this provides the best reproduction quality (e.g. run length encoding, Huffinan encoding). A lossy compression algorithm can be used but this may reduce the fidelity of the original signal (e.g. MPEG audio, streaming audio). Lossy compression can be applied to the signal where the compression distortion is not noticeable. Another form of compression is frequency shifting, which shifts the frequency of the ultrasonic signal to one that can be stored on a regular audio CD. At playback, the signal is shifted back to the higher frequency for ultrasonic playback.

A divide and conquer compression method may also be used to record ultrasonic signals on a CD. The predistortion, phase shifting, and modulation can be performed before recording to the CD. Then the modulated signal is sampled at 88.2 kHz. Alternate 16 bit samples at 44.1 kHz are then recorded onto the two channels of the CD. At playback, the interleaved samples are fed to a single digital-to-analog converter (DAC) operating at 88.2 kHz. The output signal from the DAC is then supplied to the ultrasonic amplifier.

In another embodiment a method for storing the pre-processed signal on an audio bandwidth CD, or other storage medium, is to frequency shift the modulated carrier signal down to the audio band; and then record it onto the medium. For example, if a single-sideband modulator is used in the pre-processor that has an output spectrum occupying 25 KHz to 40 KHz, then the bandwidth is only 15 KHz and can be shifted by −24 KHz to occupy 1 KHz to 16 KHz on the audio medium. To play back the pre-processed material signal, the signal is shifted up by +24 KHz, then it is amplified and applied it to the ultrasonic emitter. Similarly, in another embodiment, an AM modulated carrier can be band-limited and shifted down to occupy only the audio band.

Generally, such a frequency shifter uses a phase-shift circuit or algorithm that derives both in-phase (0 degree) and quadrature (90 degree) versions of the signal to be shifted. To minimize the hardware required for parametric loudspeaker playback system, the phase shifter portion of the frequency shifter can be implemented in the pre-processor and the in-phase and quadrature signals can be stored on the Left and Right channels, respectively, of a stereo playback medium.

Another alternative configuration can be used to record ultrasonic signals on a CD designed to store audio bandwidth. This embodiment stores a pre-distorted baseband audio signal on a CD. This signal is then modulated during playback using a switching modulator after it has been retrieved from the CD. The recording portion of the system pre-distorts voice or music audio signals prior to storage on a CD to achieve reduced distortion from the parametric transducer(s). An arbitrarily high-order of complexity for a distortion compensator may be used since the pre-distortion of the audio signal can be computed off-line. Since pre-distortion keeps the signal in the audio frequency range, the audio data may be compressed using any well known audio CODEC. For example, using the MP3 audio file format, over 10 hours of music can be stored on a single CD with the "high quality" 128 Kbps compression rate or 160 hours of voice on a CD. Many new CD players will directly decode the MP3 audio data files saved on a CD.

The playback of the pre-distorted audio signal can be performed using a standard CD player with an analog modulator. After the pre-recorded signal is retrieved from the CD, the pre-processed audio from the CD is sent to a switching modulator circuit to shift the audio signal into the ultrasonic range.

Figure 9:
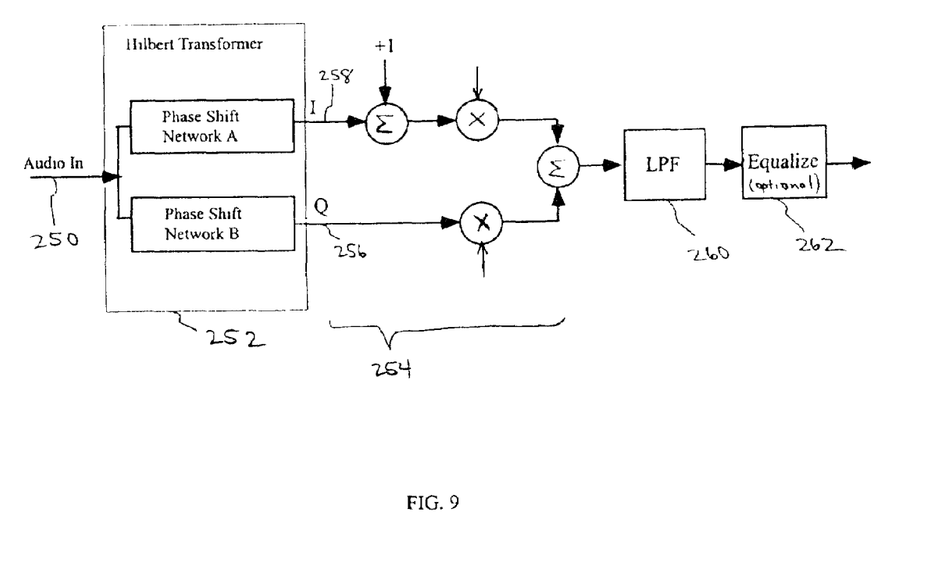
FIG. 9 illustrates a block diagram of a switching modulator used for playback of a pre-distorted audio signal.

A block diagram of the switching modulator is shown in FIG. 9. The switching modulator may accept recorded or live audio as input 250. Live audio signals must be sent through a phase shifter or Hilbert transformer 252 and then a quadrature modulator 254 to derive the ultrasonic signal and carrier for the power amplifier and ultrasonic transducer. The switching modulator can perform upper-sideband (USB), lower-sideband (LSB), or amplitude modulation (AM).

The two parts of a switching modulator will now be discussed in further detail. The first part is a phase shifter. A single channel of audio input is passed through a phase shift network that derives two audio frequency channels, I and Q (256 and 258), that are 90 degrees out of phase from each other over some desired operating frequency range (e.g., 300 Hz to 15 KHz). This allows for the storage of the two phase-shifted signals on a CD. A phase sequence network 252 or Hilbert transformer generates both I and Q signals and requires approximately four op amps.

The second element is a quadrature modulator 254 or switching modulator that is used for generating the SSB signal. The I and Q audio signals are passed into the modulator stage that shifts the signal to the ultrasonic frequency range and adds a carrier tone. This circuit takes advantage of the fact that square waves have only odd harmonics and that multiplying by +1 or −1 requires only an inverter and an analog switch. The quadrature modulator consists of a quadrature square wave oscillator, analog switches and a low-pass filter 260. The signal may also be equalized 262 if desired.

This system pre-distorts the audio, phase shifts it, and stores the I and Q signals to the left and right channels of a CD, respectively. The advantage of this embodiment is that it uses an inexpensive quadrature modulator to get extremely low-distortion output for the pre-recorded ultrasonic audio signal.

It should be pointed out that any audio source such as a tape player, MP3 player, CD player, or personal computer sound output may be used with this modulator. If the I or Q signals are heard directly in a non-parametric system, they sound just like the normal source material. If the system pre-distorts the audio signal, the signal sounds somewhat distorted in a non-parametric system.

Processing live audio requires both parts of the switching modulator (phase shifter and quadrature modulator) and does not use distortion correction. This is a more expensive embodiment. When the stored audio is distortion corrected and phase shifted prior to recording on stereo tracks, then only the quadrature modulator is required for playback. This embodiment for processing live audio costs about three times what it costs to build a system that only plays a pre-distorted signal. The switching modulator reduces the cost of the analog electronics significantly because the analog multipliers are eliminated. This is because a conventional quadrature sinewave oscillator can be used. Using the switching modulator is achieved at the expense of requiring a low pass filter at the output. Even though this embodiment eliminates the need for the quadrature generator in the playback electronics, it only allows only one channel of audio on the CD. If two channels are desired, the pre-distorted baseband signals can be recorded directly onto the CD and the phase shifting and modulation performed by the playback electronics.

Performing the signal processing ahead of time allows the incorporation of high-order compensators running on a computer that is separate from the playback system. Software is used to create pre-processed audio tracks that are copied onto CDs.

Figure 7:
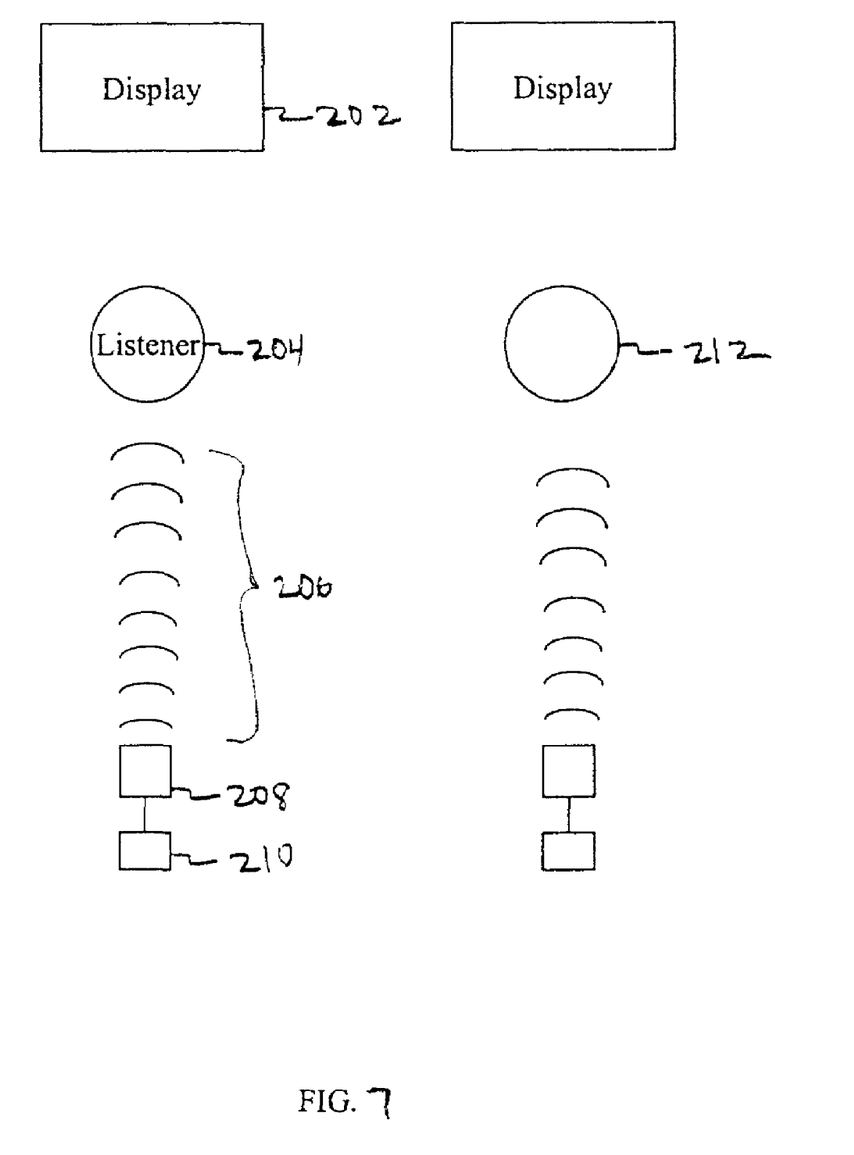
FIG. 7 illustrates a parametric audio system for localized audio presentations.

The elimination of hardware previously associated with the production of quality parametric output now enables the general application of parametric systems in low cost systems. As illustrated in FIG. 7, these applications include localized audio presentations for displays 202, focused commercial advertising along shopping aisles, recurring broadcast of public information, etc. In these situations, a prerecorded parametric signal can be played back through an inexpensive amplifier circuit 210 to an ultrasonic emitter 208 which is directionally oriented toward the listener 204 or a limited listening area. The parametric output 206 is focused on one region of a listening area 204 which is the only place the highly directional parametric output can be heard. For example, the first listener 204 is not able to hear the audio program being delivered to a second listener 212. Because the unique requirements for parametric processing have previously been incorporated into the recorded signal, no additional circuitry or signal processing is required. This invention therefore offers the advantage of directional parametric programming, along with the lower expense of conventional amplifier/speaker systems.

Figure 8:
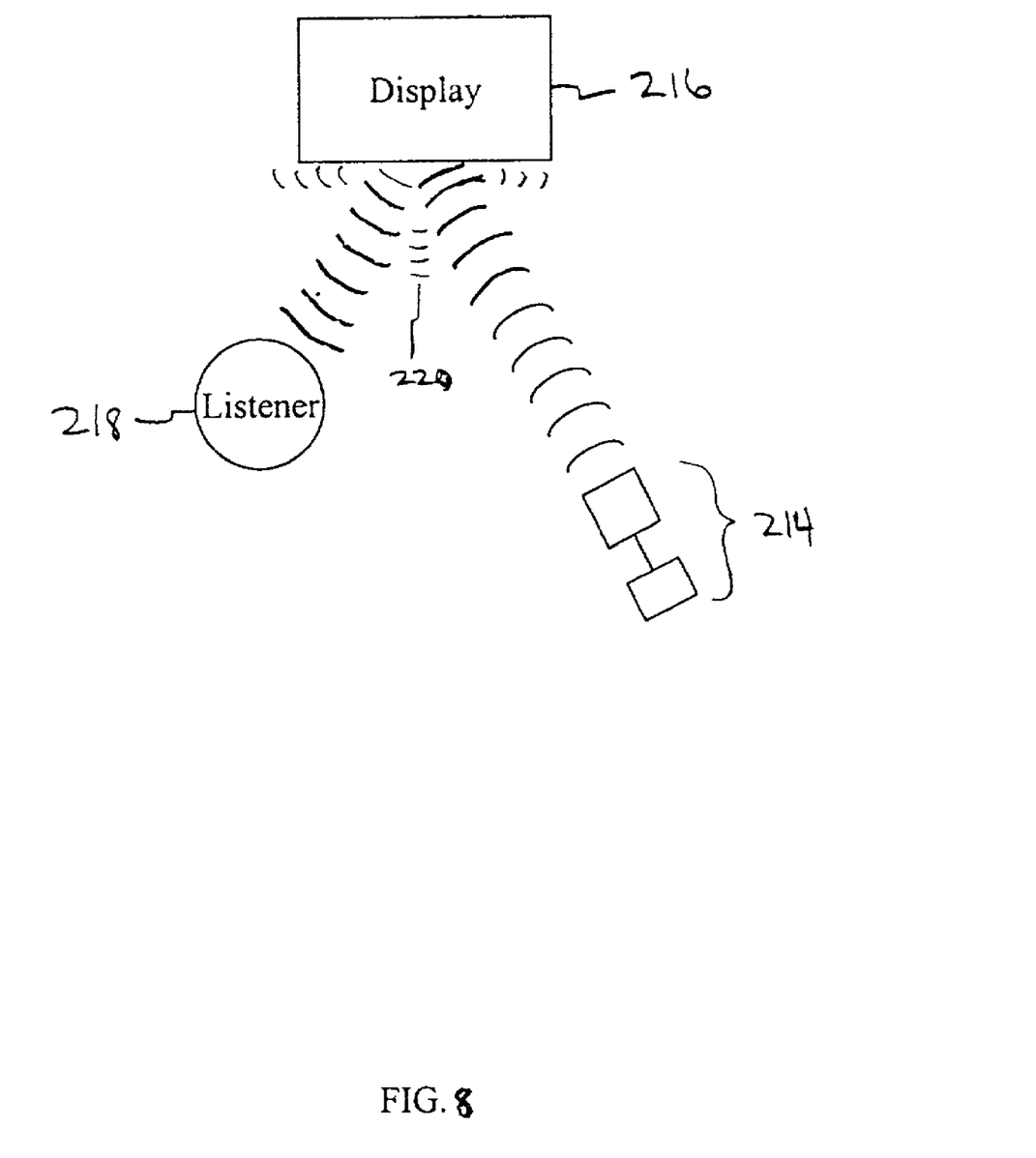
FIG. 8 illustrates a parametric audio system that produces a virtual speaker.

FIG. 8 illustrates the directional nature of the parametric output. An ultrasonic amplifier and emitter 214 are directed toward a reflecting surface 216, such as a display. A large portion of the directional parametric waves are reflected to a listener 218 who hears the sound as though it is originating from the reflecting point on the display. Another set of local reflections 220 creates an omni-directional speaker near the reflecting point. In this case, the parametric output sounds as though it is virtually coming from the display. This example shows the parametric output being reflected against a display but it could also be reflected against a wall. The phenomenon related to a virtual point source speaker is described in further detail in U.S. Pat. No. 6,229,899 filed Sep. 24, 1998 and entitled "Method and Device For Developing a Virtual Speaker Distant from the Sound Source".

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in shape, form, functionality and manner of operation, and use may be made, without departing from the principles and concepts of the invention as set forth in the claims.

The invention claimed is:

1. A method for generating parametric output from a parametric loudspeaker system, comprising the steps of:
retrieving a pre-encoded audio signal from an electronically readable, optical storage medium with ultrasonic bandwidth, wherein an ultrasonic carrier signal having at least one sideband represents the pre-encoded audio signal; and
playing back the pre-encoded audio signal through an ultrasonic amplifier and emitter.

2. A method as in claim 1, wherein retrieving a pre-encoded audio signal further comprises the step of retrieving the pre-encoded audio signal which has been pre-processed.

3. A method as in claim 2, further comprising the step of retrieving the pre-encoded audio signal which has been pre-processed with distortion error correction.

4. A method as in claim 1, further comprising the step of modulating the ultrasonic carrier signal with the audio signal to produce the pre-encoded audio signal.

5. A method as in claim 1, further comprising the step of retrieving a processed audio signal from a magnetic storage medium with ultrasonic bandwidth.

6. A method as defined in claim 1, comprising of the further steps of:
positioning the parametric loudspeaker system with a projection orientation toward an intended listening area; and playing back the pre-encoded audio signal in a region substantially limited to the intended listening area.

7. A method for storing parametric output for later playback from a parametric loudspeaker system, comprising the steps of:
modulating an ultrasonic carrier with an audio signal to create a modulated signal comprising the ultrasonic carrier signal and at least one sideband signal;
producing a processed signal that represents the modulated signal; and
storing the processed signal on an electronically readable storage medium;
wherein the step of modulating the ultrasonic carrier further comprises the step of applying distortion error correction to the audio signal to produce the processed signal.

8. A method as in claim 7, further comprising the step of playing back the processed signal from the electronically readable storage medium through an ultrasonic amplifier and emitter.

9. A device for storing parametric audio signals for output through a parametric loudspeaker system, comprising:
an electronically readable storage medium;
an ultrasonic carrier signal having at least one sideband which represents a pre-encoded audio signal, wherein said pre-encoded audio signal is stored on the electronically readable storage medium; and
an error correction module to pre-distort the modulated signal and form a processed signal.

10. The device as in claim 9, further comprising:
a retrieval unit for retrieving a pre-encoded audio signal from an electronically readable storage medium that has ultrasonic bandwidth; and
a playback module for playing back the pre-encoded audio signal.

11. The device as in claim 10, wherein the playback module further comprises:
an amplifier, coupled to the retrieval unit, for amplifying the pre-encoded ultrasonic signal; and
an ultrasonic emitter, coupled to the amplifier, configured to emit ultrasonic waves that de-couple in the air to audible sounds.

12. The device as in claim 9, further comprising a recording module for recording the pre-encoded audio signals onto the electronically readable storage medium, the recording means comprising:
  a modulator, configured to pre-encode an ultrasonic carrier signal with the audio signal to form a processed signal; and
  a write unit configured to write the processed signal to an electronically readable storage medium for replay by the parametric loudspeaker system.

13. The device as in claim 9, further comprising a compression module to compress the modulated signal and form a compressed signal.

14. A method for storing pre-encoded signals for a parametric loudspeaker system, comprising the steps of:
  receiving at least one audio signal;
  modulating an ultrasonic carrier signal with the audio signal to form a modulated signal comprising the ultrasonic carrier signal and at least one sideband signal;
  applying error correction to the modulated signal to form a processed signal; and
  storing the processed signal on an electronically readable storage medium for replay by the parametric loudspeaker system.

15. A method as in claim 14, further comprising the step of storing the processed signal on an optical storage medium with an ultrasonic bandwidth.

16. A method as in claim 14, further comprising the step of storing the processed signal on a magnetic storage medium with an ultrasonic bandwidth.

17. A method as in claim 14, further comprising the step of storing the processed signal on a high bandwidth storage medium with an ultrasonic bandwidth.

18. A method as in claim 14, wherein the step of applying error correction further comprises the step of applying error correction to correct for distortion introduced in the parametric demodulation process in air.

19. A method for generating parametric output through a parametric loudspeaker system, comprising the steps of:
  receiving an incoming audio signal;
  modulating an ultrasonic carrier signal with the audio signal to form a modulated signal comprising the ultrasonic carrier signal and at least one sideband signal;
  applying error correction to the modulated signal to form a processed signal;
  storing the processed signal on an electronically readable storage medium; and
  playing back the processed signal through an ultrasonic amplifier and emitter.

20. A method as in claim 19, further comprising the step of storing the processed audio signal on an optical storage medium with an ultrasonic bandwidth.

21. A method as in claim 19, further comprising the step of storing the processed audio signal on a Super Audio Compact Disk (CD).

22. A method as in claim 19, further comprising the step of storing the processed audio signal on a magnetic storage medium with an ultrasonic bandwidth.

23. A method as in claim 22, further comprising the step of storing the processed audio signal on a hard drive used as the magnetic storage medium.

24. A method as in claim 19, further comprising the step of playing back the processed audio signal through an ultrasonic emitter having a film diaphragm.

25. A device to store pre-encoded signals for a parametric loudspeaker system, comprising:
  an audio signal;
  a modulator configured to modulate an ultrasonic carrier signal with the audio signal to produce a modulated signal comprising the ultrasonic carrier signal and at least one sideband signal;
  an error correction unit configured to pre-correct the modulated signal for de-modulation distortion created by demodulation of parametric output in air; and
  an electronically readable storage medium, having an ultrasonic bandwidth, configured to store the pre-corrected, modulated signal.

26. A method for pre-encoding signals for a parametric loudspeaker system through a computer network, comprising the steps of:
  receiving an incoming audio signal at a network processing node;
  processing an ultrasonic carrier signal with the audio signal using a computer to form a modulated signal comprising the ultrasonic carrier signal and at least one sideband; and
  transmitting the modulated signal through the computer network for replay by the parametric loudspeaker system.

27. A method as in claim 26, further comprising the step of applying error correction to the modulated signal to form a processed signal.

28. A method as in claim 27, further comprising the step of transmitting the processed signal through the computer network for storage on an electronically readable storage medium.

29. A method for generating parametric output from a parametric loudspeaker system, comprising the steps of:
  retrieving a pre-distorted audio signal from an electronically readable storage medium for storing an audible audio bandwidth;
  modulating an ultrasonic carrier signal with the pre-distorted audio signal to form a pre-encoded audio signal comprising the ultrasonic carrier signal and at least one sideband signal; and
  playing back the pre-distorted audio signal through an ultrasonic amplifier and emitter.

30. A method as in claim 29, wherein the step of modulating further comprises the step of modulating the retrieved signal using a switching modulator before playback.

31. A method as in claim 29, wherein the switching modulator further comprises a phase shifter and a quadrature modulator.

32. A method for generating parametric output through a parametric loudspeaker system, comprising the steps of:
  receiving an incoming audio signal; applying error correction to the audio signal to form an error corrected signal;
  storing the error corrected signal on an electronically readable storage medium having an audible bandwidth;
  retrieving the error corrected signal from the electronically readable storage medium;
  modulating an ultrasonic carrier signal with the error corrected signal to form a modulated signal comprising the ultrasonic carrier signal and at least one sideband signal; and
  playing back the modulated signal through an ultrasonic amplifier and emitter.

33. A method for generating parametric output from a parametric loudspeaker system, comprising the steps of:

retrieving a pre-processed audio signal from an electronically readable storage medium for storing an audible audio bandwidth, wherein the pre-processed audio signal has been distortion error corrected, modulated by an ultrasonic carrier, and compressed;

uncompressing the pre-processed audio signal; and playing back the pre-encoded audio signal through an ultrasonic amplifier and emitter.

34. A method as in claim 33, further comprising the step of uncompressing the pre-processed audio signal that has been compressed to compensate for spectrum expansion associated with modulation by an ultrasonic carrier.

35. A method for generating parametric output through a parametric loudspeaker system, comprising the steps of:

receiving an incoming audio signal;

applying error correction, ultrasonic modulation, and compression to the audio signal to form an error corrected signal;

storing the error corrected signal on an electronically readable storage medium having an audible bandwidth;

retrieving the error corrected signal from the electronically readable storage medium; and playing back the modulated signal through an ultrasonic amplifier and emitter.

* * * * *